2,798,002

Patented July 2, 1957

2,798,002

PROCESS FOR MAKING FUSED MAGNESIA

Edward D. Porter, Chippawa, Ontario, Canada, assignor to Norton Company, Worcester, Mass., a corporation of Massachusetts No Drawing. Application May 16, 1955,
Serial No. 508,830

2 Claims. (Cl. 106—60)

The invention relates to a process for making fused magnesia.

One object of the invention is to provide a fused magnesia of higher resistivity than heretofore, up to almost twice as high as previous commercial materials, thus permitting the manufacture of heating elements which will have a longer life and withstand higher power. Another object is to increase the elimination of alkali salts from the melt during the fusion process. Another object of the invention is to produce a fused magnesia with a finer grain structure than has been hitherto possible. Another object is to produce a weaker pig of fused magnesia than heretofore without resulting in weaker grain produced therefrom by crushing and milling. Another object is to provide a softer fused magnesia which is easier to crush. Another object is to reduce milling costs in the milling of the fused magnesia grain to produce the various grit sizes desired.

Other objects will be in part obvious or in part pointed out hereinafter.

For the manufacture of heating elements for electric stoves for domestic use and also for commercial use, fused magnesia has for some time been used as a filler material to fill the steel sheath surrounding the resistance wire or wires, this fused magnesia being the insulating material preventing short-circuit. This invention relates to the production of fused magnesia for this use and any other use desired.

I make use of an electric arc furnace and the construction of these furnaces is now well known in the art. Such furnaces have steel shells over which water is cascading during the fusion of the material. Carbon or graphite electrodes are used and these are automatically raised and lowered in accordance with the power required to maintain the fusion at the desired temperature during the charging of the furnace and until the entire charge has been fused.

The principal furnace charge is amorphous magnesia. I can use and prefer calcined India magnesite. Magnesite is magnesium carbonate and calcining it drives off the $CO_2$ leaving MgO in an amorphous form by which I mean it has no coarse crystal structure. There are natural deposits of magnesite at many places in the world and a good source is India. I can also use a chemically produced magnesia available from the southern part of the United States and produced by the chemical processing of magnesium chloride resulting from fertilizer production. This is my secondary preferred raw material and is also a non-crystalline with the same meaning finely divided magnesia.

I may use sea water magnesia produced by calcining magnesium carbonate obtained from the magnesium chloride in sea water. I may use magnesia obtained from sea water by any other process and in fact within the scope of my invention any magnesia can be used. However, the magnesia used should analyze within the following limits:

Table 1

Magnesium calculated as MgO, at least 90%.
Calcium calculated as CaO, not more than 3.0%.
Silicon calculated as $SiO_2$, not more than 6.0%.
Iron calculated as $Fe_2O_3$, not more than .5%.
Aluminum calculated as $Al_2O_3$, not more than 5.0%.
Boron calculated as $B_2O_3$, not more than .5%.
Sodium calculated as Na, not more than trace.
Potassium calculated as K, not more than trace.
Lithium calculated as Li, not more than trace.
Other material not more than 2.0%.

I have found that the addition of a small amount of carbon to the furnace charge in the form of any carbonaceous material uncontaminated detrimentally with other non-volatile materials, in the amount of from .5% to 10%, materially improves the product in the manner indicated in the objects. I prefer to use calcined petroleum coke but may use other sources of carbon such as metallurgical or pitch coke. It is desirable that the particle size of the coke be in the range between 10 mesh and one inch. The percentages above given as in all percentages herein are by weight. Also the percentages of carbon are that of the free or available carbon in the coke or other carbonaceous material and the percentages are percentages of the magnesia charge (not including the addition).

The calcined magnesite which may be in the form of fines or pellets of sizes up to one inch is fed to the furnace in the usual way. It is preferable to premix the two materials.

The temperature of the fusion of magnesia is approximately known and is about 2700° C. Adding the carbon, and the percentages given are based on the free carbon present in the coke, the run is a little hotter, that is to say the power input can be a little lower. The graphite electrodes do add and have always added some carbon to the fusion but I find that the deliberate addition of carbon in the manner indicated improves the process and improves the product in the manners indicated. It is understood, as is known in the art, that the magnesia is actually melted during the process, that is to say around the electrodes it is molten and every bit of it that makes useful material in the pig has been at least for a short time in the molten state.

The addition of carbon to the furnace charge appears to drive off the alkali salts from the fusion. It also drives off the alkaline earth salts. This has the effect of materially raising the resistivity of the final product. Small amounts of alkali salts in the final product lower the resistivity thereof. The addition of carbon to the charge also makes the pig softer and why this should be I do not know.

After the charge has been completely fused, has solidified to a pig, and has cooled sufficiently so that it can be worked on, the pig is broken up with sledge hammers. The pieces are then crushed in a jaw crusher to produce lumps of about one and a half inch size and smaller. By a succession of crushers and roll mills these lumps are then reduced to the required grain size which ranges from 40 mesh to 500 grit size. Usually finer material is returned for refusion or otherwise disposed of.

The grain is then calcined in an oxidizing atmosphere at a temperature of about 1300° C. This can be done in a tunnel kiln. The magnesia grain thus produced is the product according to the invention and is sold to manufacturers of heating elements as insulating material.

The product of my invention analyzes within the following limits:

Table II

|  | From, percent | To, percent |
| --- | --- | --- |
| Silicon calculated as $SiO_2$ | trace | 6.0 |
| Calcium calculated as CaO | trace | 3.0 |
| Aluminum calculated as $Al_2O_3$ | trace | 5.0 |
| Iron calculated as $Fe_2O_3$ | .01 | .20 |
| Boron calculated as $B_2O_3$ | trace | .10 |
| Sodium calculated as Na | trace | trace |
| Potassium calculated as K | trace | trace |
| Lithium calculated as Li | trace | trace |
| Carbide calculated as carbon | trace | .5 |
| Other Material | trace | .5 |
| Magnesia by Difference | 99.9 | 90.0 |

The final poduct is a crystalline fused magnesia and the mineralogical name is periclase. It has a specific resistance of from 30 to 40 megohm-inches at 980° C. The unit megohm-inches is a standard unit and means the resistance of a cubic inch and can be worked out on the law that resistance increases linearly with length and decreases linearly with the cross section area, that is to say decreases by the square of the diameter if round. This is a considerable increase in resistivity as prior commercial electrical periclases have not often had a resistivity greater than 25 megohm-inches, at 980° C. The coke is fed to the furnace from time to time during the fusion of the magnesia charge and is preferably fed with the magnesia.

The resistivity of my elecrical periclase is of the order of at least 30 megohm-inches all over the range of Table II. It has been found, however, that the highest resistivities are obtained when the magnesia content is from 95% to 99.5%. I do not know what other materials should make up the balance to give the highest resistivity. The various elements in Table II are most of them combined with oxygen (except the carbon) but not always as the simple compounds given inscmuch as there may be some spinel present and also other combinations of the oxides. How the carbon is combined other than it is probably carbide I do not know but I suspect that the soluble carbides aluminum carbide, calcium carbide and magnesium carbide predominate. Magnesium carbide has been reported as probable but difficult to synthesize and a magnesium-calcium carbide appears to be known so these may exist in my product. The presence of the carbide was detected by the smell of the product when wet which indicates a soluble carbide.

For further discussion of the technology of making electrical periclase by fusing calcined magnesite in an electric furnace, reference may be made to the patents of Raymond R. Ridgway and Archibald H. Ballard assigned to my assignee, Nos. 2,280,515, 2,280,516 and 2,280,517, all dated April 21, 1942, but insomuch as technology has advanced since the date of these patents anything therein inconsistent with this specification is not represented to be my opinion. This is not stating that there is anything in those three patents inconsistent herewith.

The results of the addition of carbon to the charge are somewhat surprising because the addition of carbon would be considered to be an obvious way of lowering the resistivity. Apparently most of it is removed during the calcining operation although as Table II shows there is frequently some left in the form of carbide.

I cannot give the amounts of the alkali and alkaline earth salts in Table I because they are present merely as traces (a few parts in a million). By spectroscopic examination the elements sodium, potassium and lithium have been observed in magnesias used to make electrical periclase and by spectroscopic examination of the electrical periclase produced according to my invention there is considerably less of these elements in my electrical periclase than was in the charge. However, it is impossible to give exact amounts since these are unknown.

The results of adding the carbon to the charge include the production of a weaker pig which therefore can be more easily broken by sledge hammers. It is also a softer material and therefore the pieces can be crushed in jaw crushers without so much wear on the jaw crushers and the resulting lumps can be reduced to grain sizes by roll mills without so much wear on the roll mills.

While I may use from .5% to 10% of carbon, I have found that I obtain the best results adding from 3% to 5% thereof to the charge. I can generally obtain a resistivity at 980° C. of at least 35 megohm-inches by providing a charge resulting in from 95 to 99.5% of magnesia in the periclase. Naturally if, within the limits given herein, some permutation thereof (and there are many) results in a resistivity of greater than 40 megohm-inches at 980° C., this product is within my invention so I am claiming it as having a specific resistance at the temperature mentioned of at least 30 megohm-inches and for the best material of at least 35 megohm-inches.

It will thus be seen that there has been provided by this invention fused magnesia and process of making same in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

1. In the process of making electrical periclase and the like and increasing the electrical resistivity thereof by the fusion of a charge of magnesia to a molten state in the electric furnace having graphite or carbon electrodes, said charge analyzing by weight within the following limits:

Magnesium calculated as MgO at least 90%
Calcium calculated as CaO, not more than 3.0%
Silicon calculated as $SiO_2$, not more than 6.0%
Iron calculated as $Fe_2O_3$, not more than .5%
Aluminum calculated as $Al_2O_3$, not more than 5.0%
Boron calculated as $B_2O_3$, not more than .5%
Sodium calculated as Na, not more than trace
Potassium calculated as K, not more than trace
Lithium calculated as Li, not more than trace
Other material not more than 2.0% the improvement which consists in the addition of carbon in the amount of from .5% to 10% by weight of the charge in addition to the carbon derived by the charge from the electrodes, allowing the fusion to solidify, crushing the resultant product and producing grain therefrom, and then calcining the grain in an oxidizing atmosphere.

2. Process according to claim 1 in which the percentage of carbon is from 3% to 5%.

References Cited in the file of this patent

UNITED STATES PATENTS

| 2,280,515 | Ridgway et al. | Apr. 21, 1942 |
| 2,280,516 | Ridgway et al. | Apr. 21, 1942 |
| 2,280,517 | Ridgway et al. | Apr. 21, 1942 |

OTHER REFERENCES

Page 480 of the book by A. B. Searle entitled "Refractory Materials, Their Manufacture and Use," 3rd edition revised, (1950). A copy in Div. 56.)